United States Patent [19]

Kunze et al.

[11] 4,039,203
[45] Aug. 2, 1977

[54] CONICAL GUIDE FOR A COUPLING PIN ON AN AGRICULTURAL IMPLEMENT

[75] Inventors: Dieter Kunze, Siegburg; Wilhelm von Allworden, Lohmar, both of Germany

[73] Assignee: Jean Waltersheid GmbH, Lohmar, Germany

[21] Appl. No.: 695,426

[22] Filed: June 14, 1976

[30] Foreign Application Priority Data

Mar. 24, 1976 Germany .................... 2612426

[51] Int. Cl.² ............................................. B60D 1/00
[52] U.S. Cl. .................................................. 280/515
[58] Field of Search ........... 280/515, 509, 508, 460 A, 280/461 A, 477

[56] References Cited

U.S. PATENT DOCUMENTS

| 1,240,818 | 9/1917 | Buller | 280/508 X |
| 2,912,257 | 11/1959 | Du Shane | 280/509 X |
| 3,220,751 | 11/1965 | Tweedale | 280/461 A X |
| 3,420,550 | 1/1969 | Rau | 280/460 A |

FOREIGN PATENT DOCUMENTS

| 250,711 | 5/1963 | Australia | 280/460 A |

Primary Examiner—Joseph F. Peters, Jr.
Assistant Examiner—Michael J. Forman
Attorney, Agent, or Firm—Edmund M. Jaskiewicz

[57] ABSTRACT

A conical guide for mounting on a coupling pin of an implement or the like which can be coupled to a three-point connection of a tractor may comprise a semi-conical member or a complete conical member divided to form two semi-conical members. The single semi-conical member is positioned about the coupling pin and has a clamp also positioned about the coupling pin so that the clamp and semi-conical member completely enclose the pin and are secured against axial displacement on the coupling pin by radially inwardly directed projections received within a notch in the pin. With a full conical member one of the semi-conical guide members functions as a clamp.

5 Claims, 3 Drawing Figures

CONICAL GUIDE FOR A COUPLING PIN ON AN AGRICULTURAL IMPLEMENT

The present invention relates to a conical guide for a coupling pin of an implement which can be coupled to a three-point connection on a tractor, more particularly, to such a conical guide which can be slidably positioned on the coupling pin and secured thereon against axial displacement.

Various forms of guide members have been provided on the coupling pins of agricultural implements to guide the coupling pin into engagement with a coupling hook on a tractor. One such guide comprises a conical guide member attached by a cotter pin to a sleeve upon which is a component of a spherical or ball joint. The sleeve is slid over the coupling pin and secured thereon against axial displacement by a locking bolt. Another form of a guide member comprises the guide member being made integral with the sleeve having a ball joint element thereon and the combined guide member and sleeve is connected by a pin to the coupling pin of the implement so as to preclude any displacement of the sleeve thereon. These forms of guide members have the disadvantage that they can be used only in connection with the lower guide members which are provided with ball or spherical type couplers or with coupling hooks having correspondingly shaped openings. This is a particular disadvantage since the conventional and more widely used coupling hooks and coupling pins have cylindrical coupling surfaces.

Instead of the sleeve as described above having a ball coupling element for the coupling hook thereon, it has also been proposed to provide a tubular sleeve having a suitable shape corresponding to the coupling hook with the sleeve being slid upon the coupling pin and fastened thereon. However, when such sleeves are used, the opening of a coupling hook must be of sufficient size to accommodate the coupling pin with the sleeve thereon. This required modification of the coupling hook is unsatisfactory.

In addition, when the tractor is operated under working conditions such a sleeve positioned over the coupling pin is repeatedly impacted and hammered so as to, in effect, become forged. Because the sleeve has a relatively thin wall thickness the sleeve is greatly stressed by various tension, compression, bending and frictional stresses that the sleeve wear out after a relatively short time and the sleeve susceptible to breaking under a load.

It has also been known to provide conical guide members which do not have a tubular sleeve which interact between the coupling hook opening and the coupling pin. Such a guide way comprise a conical guide member having a central bore to which is attached an outwardly extending tubular element that can be slid upon the coupling pin. The conical element is provided with a bore extending perpendicularly to its center and this bore is aligned with a locking pin bore in the coupling pin. The guide member is fixed upon the coupling pin by inserting a suitable fastener element such as a cotter pin or the like, into the aligned bores. However, this form of a guide member has the disadvantage in that the free space for the coupling hook between the conical guide member and the implement side of the coupling pin is considerably limited by the manner of attaching the guide member to the coupling pin. As a result, movement of the coupling pin in the coupling hook encountered during operation of the tractor and attached implement will cause jamming and rapid wear of the guide and the fastener element and may even shear off the fastener element.

It is therefore the principal object of the present invention to provide a novel and improved conical guide for mounting on a coupling pin of an implement which can be coupled to a tractor.

It is another object of the present invention to provide such a conical guide that when mounted on the coupling pin will increase the degree of freedom for the coupling hook while at the same time the guide is not axially displaceable on the coupling pin.

According to one aspect of the present invention a conical guide for mounting on a coupling pin of an implement or the like which can be coupled to a three-point connection of a tractor may comprise a semi-conical member having a portion along its central axis to enclose partially a coupling pin. Means are attached to the conical member which have a correspondingly shaped enclosing portion thereon so as to clamp the conical member to the coupling pin. The semi-conical member and the clamping means each have a radial projection within their respective enclosing portions which are received within a notch or groove on the coupling pin so as to secure the guide against axial displacement when mounted upon the coupling pin.

The guide may also comprise a full conical member which is divided in two and these divided members are then clamped about the coupling pin so that one of the divider members performs the clamping function as described above.

It will be apparent that the present invention has the advantage over known guides in that it is now possible to increase significantly the degree of freedom for the coupling hook in the space between the conical guide and the side of the coupling pin directed toward the implement.

Other objects of the present invention will be apparent upon reference to the accompanying descriptin when taken in conjunction with the following drawings, which are exemplary, wherein.

Proceeding next to the drawings wherein like reference symbols indicate the same parts throughout the various views, a specific embodiment and modifications of the present invention will be described in detail.

Figure 1:
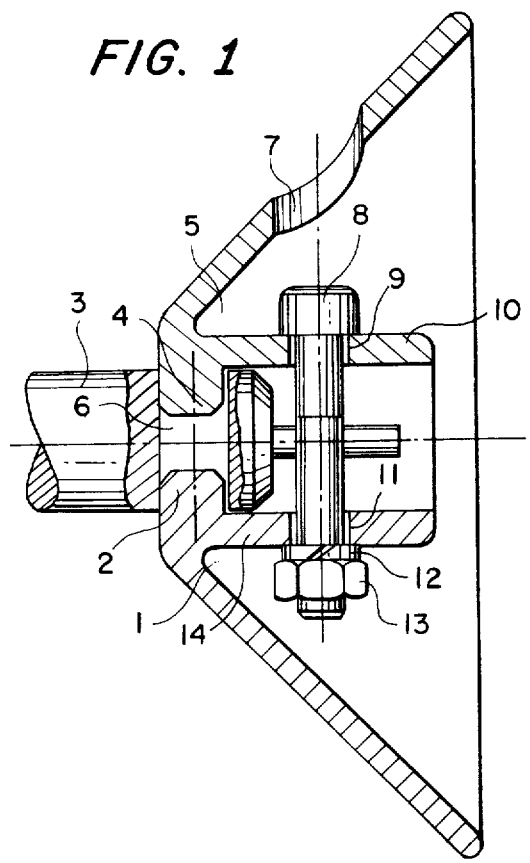
FIG. 1 is a longitudinal sectional view of a complete conical guide member according to the present invention.

In FIG. 1, there is illustrated a conical guide in accordance with the present invention which comprises two partial or semi-conical members 1 and 5 having clamping or enclosing portions 10 and 14 formed thereon with each portion having transverse bores 9 and 11 therethrough for receiving a clamping bolt 8 having a washer 12 and a nut 13. A coupling pin 3 which is provided on the implement or the like is provided with radially extending notches or bores 6 or may be provided with an annular groove. The clamping portions 10 and 14 extend substantially along the central axis of the conical guide and are provided with inwardly directed radial projections 2 and 4 that are received within the locking pin bores or notches 6. An opening 7 is provided in the semi-conical member 5 to be used in the assembly process and through which the bolt 8 is inserted.

Figure 2:
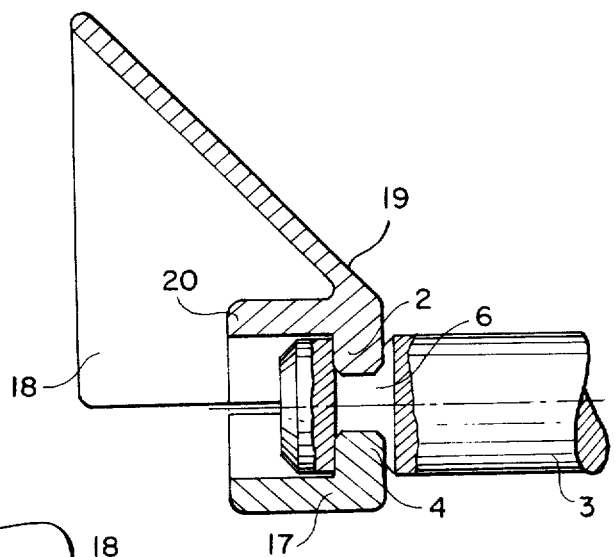
FIG. 2 is a longitudinal sectional view of a conical guide comprising a semi-conical member and a clamp; and, FIG. 3 is an elevational view of the conical guide shown in FIG. 2.
Figure 3:
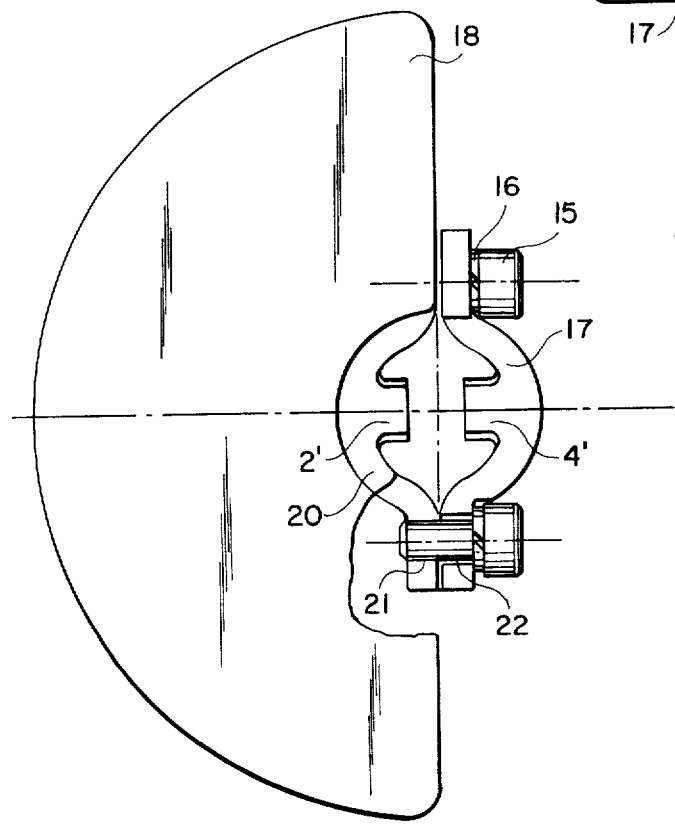

In FIGS. 2 and 3, the conical guide comprises a semi-conical member 18 having a substantially axially extending portion 20 that encloses the coupling pin 3 and a radial projection 2 which is received within a radial locking bore 6 of the coupling pin 3 in the manner as described above. The semi-conical member 18 is also provided with a surface 19 which is abutted or engaged by the coupling hook and flange portions in which are provided threaded bores 21. The enclosing portion 20 is covered by a clamp 17 which is similarly provided with a radial projection 4' received in a locking bore 6 of the coupling pin. The clamp 17 is secured by means of screws 15 and washers 16 which are threaded into the bores 21. The screws 15 pass through bores 22 formed in flanges extending laterally from the clamp 17. The clamp 17 and its enclosing portion when connected to the semi-conical member 18 and its enclosure portion 20 will completely surround and enclose the coupling pin 3 in the manner as illustrated in FIG. 3.

When the complete conical guide member 1, 5 of FIG. 1 is mounted upon the coupling pin 3, the coupling pin is similarly surrounded by the enclosing portions 10 and 14 and the projections 2 and 4 are engaged in the locking pin bores 6. The clamping bolt 8 is inserted through the assembly opening 7 and secured through the bores 9 and 11 by means of the washer 12 and nut 13. Tightening of this nut 13 will pull both semi-conical members 1 and 5 firmly toward each other and will simultaneously secure them against axial shifting on the coupling pin 3 since the radial projections 2 and 4 are engaged within the locking pin bores 6.

During the coupling operation, the coupling hook is guided by the conical surfaces into the coupling position which is engagement with the coupling pin 3. Because of the structure by means of which the semi-conical members 1 and 5 are mounted on the coupling pin 3, sufficient space remains unrestricted for the movement of the coupling hook to provide all desired degree of freedom. The semi-conical members 1, 5 and 18 have abutment surfaces 19 that further increase or widen the freedom of movement of the coupling hook.

The mounting of the semi-conical guide of FIGS. 2 and 3 is carried out in the same manner as for the mounting of the full conical guide of FIG. 1. Further, the conical guide of FIGS. 2 and 3 will function in the same manner as that of the conical guide of FIG. 1.

It is therefore apparent that the advantages of the present invention are achieved by utilizing a clamping structure for mounting the conical guide on the coupling pin and this clamping structure has radial projections which engage bores on the coupling pin for securing the guide member thereon. Because of this construction, a considerable portion of the length of the coupling pin is free. This free portion was previously utilized in prior art guide members by structure surrounding a bore provided for a pin or bolt to secure the coupling guide in position. It is to be noted that the required length of the coupling pin does not extend beyond the implement side edge of the locking pin bore in the coupling pin. Since it is not feasible to merely extend the length of the coupling pin because of structural limitations and conformance to various safety standards, the present invention provides for failure-free operation of the coupling and significantly increases the operating life for coupling pins and guide members.

The partial conical guide member is more economical in structure but provides the same advantages and operates in the same manner as the complete conical guide member. Since in most coupling operations between an implement and a tractor the coupling movement is generally in an upward direction the coupling hook need be guided by the coupling guide only in this portion of the coupling pin.

It will be understood that this invention is susceptible to modification in order to adapt it to different usages and conditions, and accordingly, it is desired to comprehend such modifications within this invention as may fall within the scope of the appended claims.

What is claimed is:

1. A conical guide for mounting on a coupling pin of an implement or the like which can be coupled to a three-point connection of a tractor, and comprising a semi-conical member having a portion along its longitudinal axis to enclose at least partially a coupling pin and tapering inwardly toward the enclosing portion, means attached to said semi-conical member and having a correspondingly shaped enclosing portion thereon for clamping said member to the coupling pin, said semi-conical member and said clamping means each having a radial projection within their respective enclosing portions receiving within a notch in the circumferential surface of said pin to secure the conical guide against axial displacement when mounted upon the coupling pin.

2. A conical guide as claimed in claim 1 wherein said clamping means comprises a second semi-conical member such that a complete conical member is mounted upon the coupling pin.

3. A conical guide as claimed in claim 2 wherein said enclosing portions define a tubular support enclosing the coupling pin.

4. A conical guide as claimed in claim 3 and a clamping bolt passing transversely through said enclosing portions to clamp said enclosing portions upon the coupling pin.

5. A conical guide as claimed in claim 4 wherein there is an opening in one of said semi-conical members through which said clamping bolt is assembled in said enclosing portions.

* * * * *